(12) United States Patent
McMahon et al.

(10) Patent No.: US 6,776,569 B1
(45) Date of Patent: Aug. 17, 2004

(54) GRAIN CART AUGER WITH CLUTCH

(75) Inventors: Randy McMahon, Lakeville, MN (US); Frank Bazzoli, Saint James, MN (US); Donald Marcy, Bingham Lake, MN (US); Trent J. Hoek, Mountain Lake, MN (US)

(73) Assignee: Balzer, Inc., Mountain Lake, MN (US)

( * ) Notice: Subject to any disclaimer, the term of this patent is extended or adjusted under 35 U.S.C. 154(b) by 0 days.

(21) Appl. No.: 10/318,643

(22) Filed: Dec. 13, 2002

(51) Int. Cl.⁷ .................................................. B60P 1/00
(52) U.S. Cl. ..................... 414/505; 414/503; 414/526; 198/666
(58) Field of Search ........................... 414/526, 502, 414/505, 503; 198/666, 667, 550.6

(56) References Cited

U.S. PATENT DOCUMENTS

| | | | | |
|---|---|---|---|---|
| 2,360,776 A | * | 10/1944 | Kozak et al. ............... | 198/666 |
| 3,874,530 A | * | 4/1975 | Purdy .......................... | 414/526 |
| 5,409,344 A | * | 4/1995 | Tharaldson .................. | 414/505 |
| 5,511,925 A | * | 4/1996 | Muth ........................... | 414/310 |
| 5,718,556 A | * | 2/1998 | Forsyth ....................... | 414/503 |
| 5,733,094 A | * | 3/1998 | Bergkamp et al. .......... | 414/526 |
| 6,042,326 A | * | 3/2000 | Thomas et al. ............. | 414/502 |
| 6,129,499 A | * | 10/2000 | Adams ........................ | 414/505 |

* cited by examiner

Primary Examiner—James R. Bidwell
(74) Attorney, Agent, or Firm—Nikolai & Mersereau, P.A.

(57) ABSTRACT

A self-unloading grain cart having a horizontal auger and a vertical auger for unloading grain from the cart. The cart having a plurality of gates for accessing a portion of the auger at one time so as not to overload the auger. The cart also having a clutch for engaging or disengaging the horizontal auger so that the vertical auger can be turned independently from the horizontal auger. The starting and stopping of the movement of grain when unloading the cart is thereby enhanced to prevent spillage and for quicker restarts with lower power requirements.

8 Claims, 3 Drawing Sheets

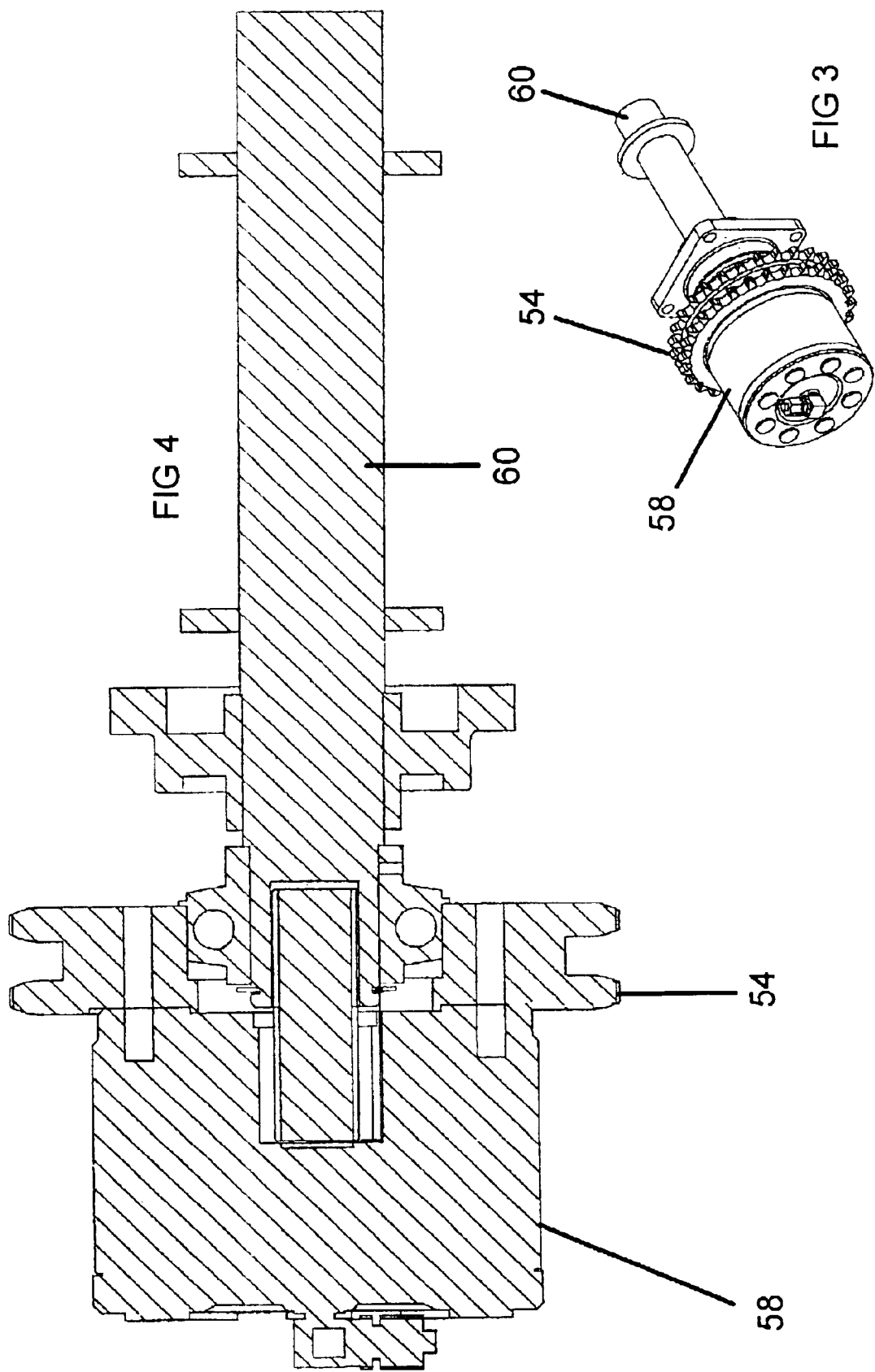

GRAIN CART AUGER WITH CLUTCH

BACKGROUND OF THE INVENTION

1. Field of the Invention

This invention relates to grain carts with horizontal and vertical augers for unloading grain from the cart and more particularly to a clutch between the vertical and horizontal augers.

2. Description of the Related Art

There are many problems with the efficient unloading of a grain cart. Grain carts typically have sections of gates over the horizontal augers to prevent grain loaded in the cart from engaging the auger along the entire length of the cart at the same time to easy the load on the auger. However sometimes the gates arc left open and the power take off for the auger is over taxed to move the grain horizontally while also powering the vertical auger to move the grain up and out of the cart to a truck, rail car or storage facility. The power required for starting the horizontal auger also varies with the type of grain and the wetness or moisture content of the grain.

For the smooth unloading of the cart into sections of trucks the auger must be stopped and restarted several times and the truck or cart moved so as to fill each bin of the truck. The auger must therefore be stopped before the bin of the truck overflows and restarted to fill the next bin. When stopped the grain in the cart may fill and clog the horizontal auger particularly if the gates are not properly adjusted to cut off flow to the horizontal auger. Similarly the auger has to be shut off after one truck is filled to wait until the next truck moves into position. Then the augers have to be restarted.

The start up force needed to power both a horizontal and vertical auger in a grain cart may overtax the power takeoff on the tractor powering the grain cart. Jamming or slow start-ups will increase the time needed for unloading the grain cart and reduce the efficiency of the unloading process. It is important to reduce down time by a swift flow of grain from the grain cart to the trucks, rail cars or other storage facility to keep the equipment in use and increase its utility. Further it is important to reduce spillage rates by having smooth controlled flows of grain from the grain carts when unloading.

Some grain carts operate the vertical and horizontal augers simultaneously making it difficult to stop the flow of grain by shutting off the power to the augers since the stream of grain is continuous.

SUMMARY OF THE INVENTION

The grain cart has gates for allowing only a portion of the contents of the cart access to the horizontal auger at any given time. The horizontal auger has a clutch to disengage the horizontal auger from the vertical auger when unloading the cart to allow the horizontal auger to stop while unloading and empty the vertical auger from the cart to end the loading of a truck bin, or start loading the next section of the truck by only powering the vertical auger and then engaging the horizontal auger. In this manner the power requirements on the power take off is reduced resulting in quicker startups and removing the grain from the vertical auger making it easier to start the horizontal auger by using a clutch between the vertical and horizontal augers.

OBJECTS OF THE INVENTION

It is an object of the invention to more easily control the emptying of grain cart by use of augers.

It is an object of the invention to reduce spillage when transferring grain from grain carts.

It is an object of the invention to provide augers which are easier to start under a load of grain.

It is an object of the invention to provide a clutch to engage the horizontal auger independently from the vertical auger.

It is an object of the invention to reduce the power requirement for starting the augers on a grain cart for unloading grain.

It is an object of the invention to increase the efficiency of unloading grain carts.

Other objects, advantages and novel features of the present invention will become apparent from the following description of (he preferred embodiments when considered in conjunction with the accompanying drawings.

BRIEF DESCRIPTION OF THE DRAWINGS

FIG. 3 is a perspective view of the horizontal auger clutch housing.

FIG. 4 is a side view of the horizontal auger clutch.

DESCRIPTION OF THE PREFERRED EMBODIMENTS

Figure 1:
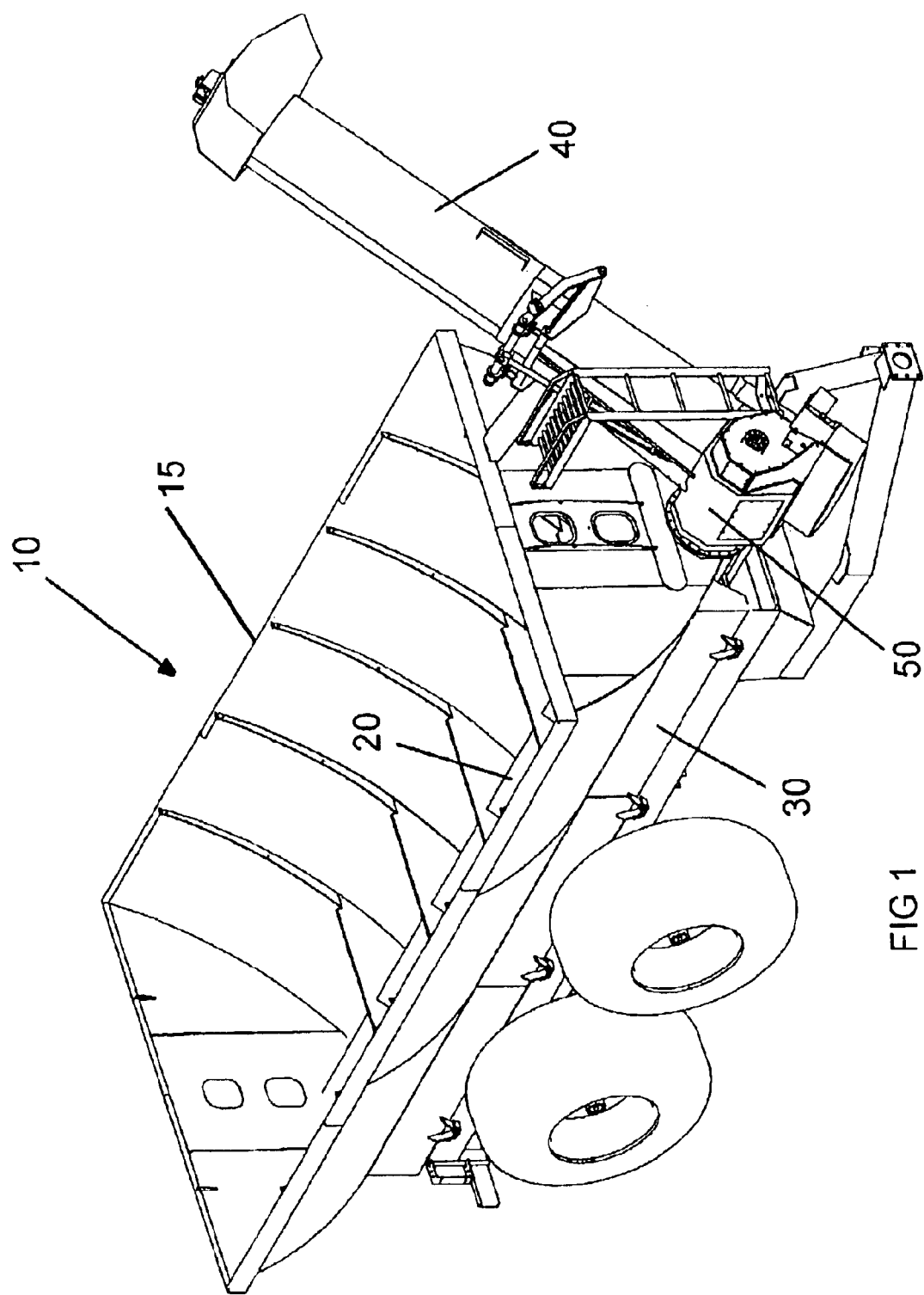
FIG. 1 is a perspective view of a grain cart with a horizontal auger and a vertical auger.
Figure 2:
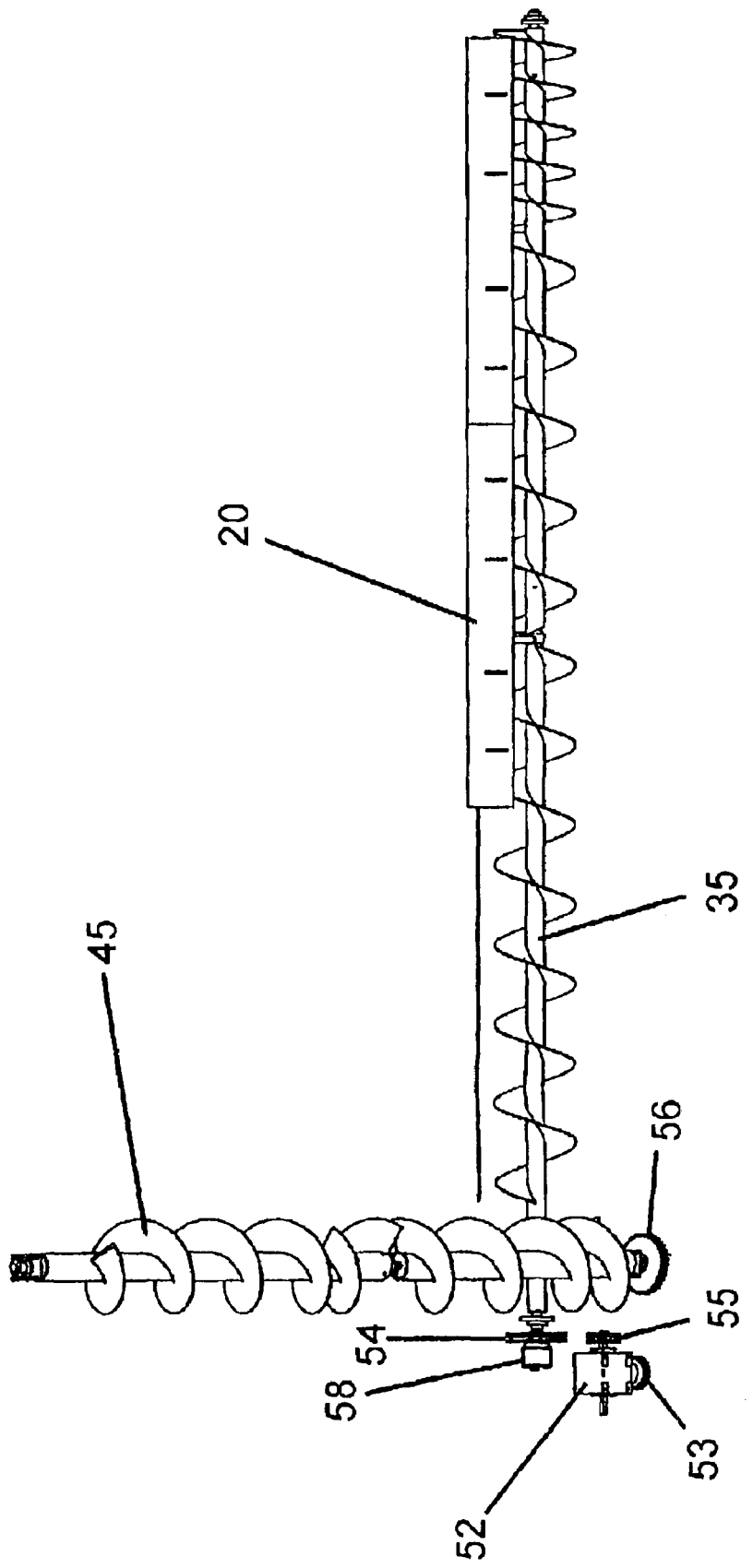
FIG. 2 is a perspective view of the augers used in the grain cart.

A grain cart 10 has a storage bin 15 for holding grain. Augers are used for unloading grain from the grain cart. There is a horizontal auger 35 inside of horizontal auger housing 30 and a vertical auger 45 inside of vertical auger housing 40. A power take off from a tractor is connected to power take off gears in the power take off housing 50 to turn the augers 35 and 45.

Inside power take off housing 50 are the power take off gear box 52 having drive gear 53 connected to gear 56 on vertical auger 45 and drive gear 55 connected to gear 54 on clutch mechanism 58 connected to horizontal auger 35. The clutch 58 contains a mechanism for selectively engaging auger drive shaft 60 which turns horizontal auger 35.

Four gates 20, two on the left side of the cart 10 and two on the right side, in bin 15 can be hydraulically moved two at a time (one on the right side and one on the left side) to uncover horizontal auger 35 allowing grain from the bin 15 to engage the horizontal auger 35 in one portion of the bin 15 at a time to reduce the load on the horizontal auger 35. Horizontal auger 35 moves the grain forward to engage the vertical auger 45. The vertical auger 45 pushes the grain up and out into a truck or other container for shipment or storage.

The method of operation of the grain cart for unloading is to only open two opposing gates 20 at a time (one on the right side and one on the left side) to limit the power requirements on auger 35. If all four gates are left fully open when the bin is full it will be very difficult for the horizontal auger 35 to turn especially when the gear box 52 also has to power the vertical auger 45. If the grain is wet or moist the power requirements for turning the augers 35 and 45 are increased.

To begin unloading a cart 10 the power take off adds power to gear box 52 to turn both the horizontal and vertical augers 35 and 45. At this time two gates 20 in one section of the bin 15 can be opened and horizontal auger 35 can begin to move grain to the vertical auger for discharging the grain from the cart 10. The gates 20 may be gradually opened two at a time first in one section of the cart 10 and then in another section of the cart 10. If the discharging is to a truck having sections the grain must be stopped and the truck or cart moved to begin filling the next bin in the truck. Alternatively if the truck is full and a new truck is put in position the augers 35 and 45 must be stopped in order to avoid grain spillage. If the gates 20 are not closed before the augers 35 and 45 are stopped a portion of the horizontal auger 35 under the gate 20 may be clogged up with grain which may be wet or moist making it difficult to start the horizontal auger. This will be particularly true if the augers 35 and 45 were stopped when still full of grain. The best practice is to close off the gates 20 in anticipation of stopping the flow of grain and then letting the augers push out the remaining grain. Restarting the flow of grain to the augers 35 and 45 is then just a matter of turning on the augers and gradually opening the gates 20 to begin the flow of grain to the next truck or the next bin in the same truck.

There are times when the gates are not opened and closed in proper sequence and grain is still in both the horizontal auger 35 and the vertical auger 45 when the auger is turned off to stop the flow of grain and prevent spillage. In this case it may require more power than the power takeoff can deliver to restart both the horizontal 35 and vertical 45 augers at the same time. In this case the clutch 58 can be disengaged and the power from the power takeoff can be used to clear the grain from the vertical auger 45 first. Then the clutch 58 can be engaged and grain can begin to flow from the horizontal auger 35 to the vertical auger 45 to resume unloading the grain cart.

Another advantage of providing clutch 58 is for shutting down the horizontal auger 35 to stop the unloading process and letting the vertical auger 45 run until it is empty thus shutting off the flow of grain and making it easier to start up again with both augers 35 and 45 engaged.

The clutch 58 is preferred as the means for engaging the horizontal auger because of the speed with which it can be engaged and the power that can be transmitted through the clutch verses the size of the clutch. Bands or belts on pulleys used to engage the auger would tend to slip on engagement and stretch over time.

The clutch 58 may be mechanically, hydraulically or electrically operated.

Clutch 58 also offers an override feature for slipping, which is a safety feature. If any large or long foreign objects enter the grain bin 15 and jams or stops augers 35, the clutch 58 will slip and provide protection to the mechanical components on the cart 10 and to people operating it.

Although the invention is shown with augers for moving grain in a grain cart the augers may be replaced by conveyor belts, belts with paddles, or drag chains to move grain, sand, aggregate or other objects.

Obviously, many modifications and variations of the present invention are possible in light of the above teachings. It is therefore to be understood that, within the scope of the appended claims, the invention may be practiced otherwise than as specifically described.

What is claimed is:

1. A self unloading cart comprising:

a bin, a horizontal material moving device centered under the bin, for receiving material in the bin and moving it horizontally, a vertical material moving device, angled upward and to the side of the cart, adjacent the horizontal material moving device for receiving material to be unloaded form the bin and moving the material vertically and to the side of the cart, a gear box for taking receiving power and turning a gear connected to a gear on the horizontal material moving device, and for turning a gear connected to a gear on the vertical material moving device, an hydraulic clutch for engaging or disengaging the horizontal material moving device from the power provided by the gear on the horizontal material moving device.

2. A self unloading cart as in claim 1 having, at least one gate in the bin for covering or uncovering portions of the horizontal material moving device.

3. A self-unloading cart as in claim 1 wherein, the horizontal material moving device is an auger.

4. A self-unloading cart as in claim 1 wherein, the vertical material moving device is an auger.

5. A self unloading cart as in claim 2 wherein, the horizontal material moving device is an auger.

6. A self unloading cart as in claim 2 wherein, the vertical material moving device is an auger.

7. A self unloading cart as in claim 5 wherein, the vertical material moving device is an auger.

8. A self unloading cart as in claim 3 wherein, the vertical material moving device is an auger.

* * * * *